(12) United States Patent
Falah et al.

(10) Patent No.: US 12,143,520 B2
(45) Date of Patent: Nov. 12, 2024

(54) NETWORK MULTI-TENANT ARCHITECTURE FOR DISTRIBUTED LEDGER SYSTEMS

(71) Applicant: Consensys Software Inc., Brooklyn, NY (US)

(72) Inventors: Samer Falah, Brooklyn, NY (US); Chaddy Huussin, West New York, NJ (US); Angela Pratt, New York, NY (US); Jitendra Bhurat, Princeton, NJ (US); Nicolae Leonte, Bournemouth (GB); Trung Nguyen, Jersey City, NJ (US)

(73) Assignee: Consensys Software Inc., Brooklyn, NY (US)

( * ) Notice: Subject to any disclaimer, the term of this patent is extended or adjusted under 35 U.S.C. 154(b) by 253 days.

(21) Appl. No.: 17/775,435

(22) PCT Filed: Nov. 17, 2020

(86) PCT No.: PCT/US2020/060879
§ 371 (c)(1),
(2) Date: May 9, 2022

(87) PCT Pub. No.: WO2021/101888
PCT Pub. Date: May 27, 2021

(65) Prior Publication Data
US 2022/0400021 A1    Dec. 15, 2022

Related U.S. Application Data

(60) Provisional application No. 62/937,714, filed on Nov. 19, 2019.

(51) Int. Cl.
*H04L 9/00* (2022.01)
*H04L 9/32* (2006.01)

(52) U.S. Cl.
CPC .............. *H04L 9/50* (2022.05); *H04L 9/3213* (2013.01); *H04L 9/3273* (2013.01)

(58) Field of Classification Search
CPC ........ H04L 9/50; H04L 9/3273; H04L 9/3213
See application file for complete search history.

(56) References Cited

U.S. PATENT DOCUMENTS 5,816,135 A    10/1998   Ferri
7,685,206 B1 *  3/2010  Mathew ................ H04L 63/105
                                                                707/785

(Continued)

OTHER PUBLICATIONS

International Search Report on Patentability for corresponding PCT application PCT/GB2021/050510 mailed on May 21, 2021.

*Primary Examiner* — Jason Chiang
(74) *Attorney, Agent, or Firm* — Renner, Otto, Boisselle & Sklar, LLP

(57) ABSTRACT

A Quorum network comprising an access controlled multi-tenant network is provided that is configured to enable access control and state isolation in a multi-tenancy Ethereum-based distributed ledger system. The access-controlled network includes one or more authenticating servers (also referred to as access controls) for providing permission control to the nodes in the network. In a standard multi-tenant network, each user of an entity (also referred to as an organization) is limited to only transacting with (also referred to as accessing) their own authorized resources. The access-controlled network utilizes an access controller to provide a singular truth for a set of managed nodes through a trusted entity (such as a Network Authorization Server).

20 Claims, 7 Drawing Sheets

(56) References Cited

U.S. PATENT DOCUMENTS

| | | | | |
|---|---|---|---|---|
| 10,616,281 | B1* | 4/2020 | Chud | H04L 63/107 |
| 10,917,471 | B1* | 2/2021 | Karumbunathan | G06F 3/064 |
| 10,992,657 | B1* | 4/2021 | Stevens | H04L 63/102 |
| 11,128,464 | B1* | 9/2021 | Loladia | H04L 63/0807 |
| 11,263,204 | B2* | 3/2022 | Kempf | H04L 9/3239 |
| 11,487,715 | B1* | 11/2022 | Karr | G06F 3/0655 |
| 11,924,060 | B2* | 3/2024 | Smith | H04L 67/566 |
| 2015/0004288 | A1 | 1/2015 | McHale | |
| 2015/0344285 | A1 | 12/2015 | Joseph | |
| 2018/0234426 | A1* | 8/2018 | Huang | H04L 9/0643 |
| 2018/0244541 | A1 | 8/2018 | Pirutin | |
| 2018/0302391 | A1* | 10/2018 | Jones | G06F 16/284 |
| 2018/0332082 | A1* | 11/2018 | Baumgart | G06F 21/34 |
| 2019/0229922 | A1* | 7/2019 | Galloway | H04L 9/3226 |
| 2020/0067907 | A1* | 2/2020 | Avetisov | H04L 63/12 |
| 2020/0106610 | A1* | 4/2020 | Doddavula | H04L 9/0637 |
| 2021/0006478 | A1* | 1/2021 | Levitt | H04L 9/3239 |
| 2022/0052988 | A1* | 2/2022 | Gadnis | H04L 67/104 |

\* cited by examiner

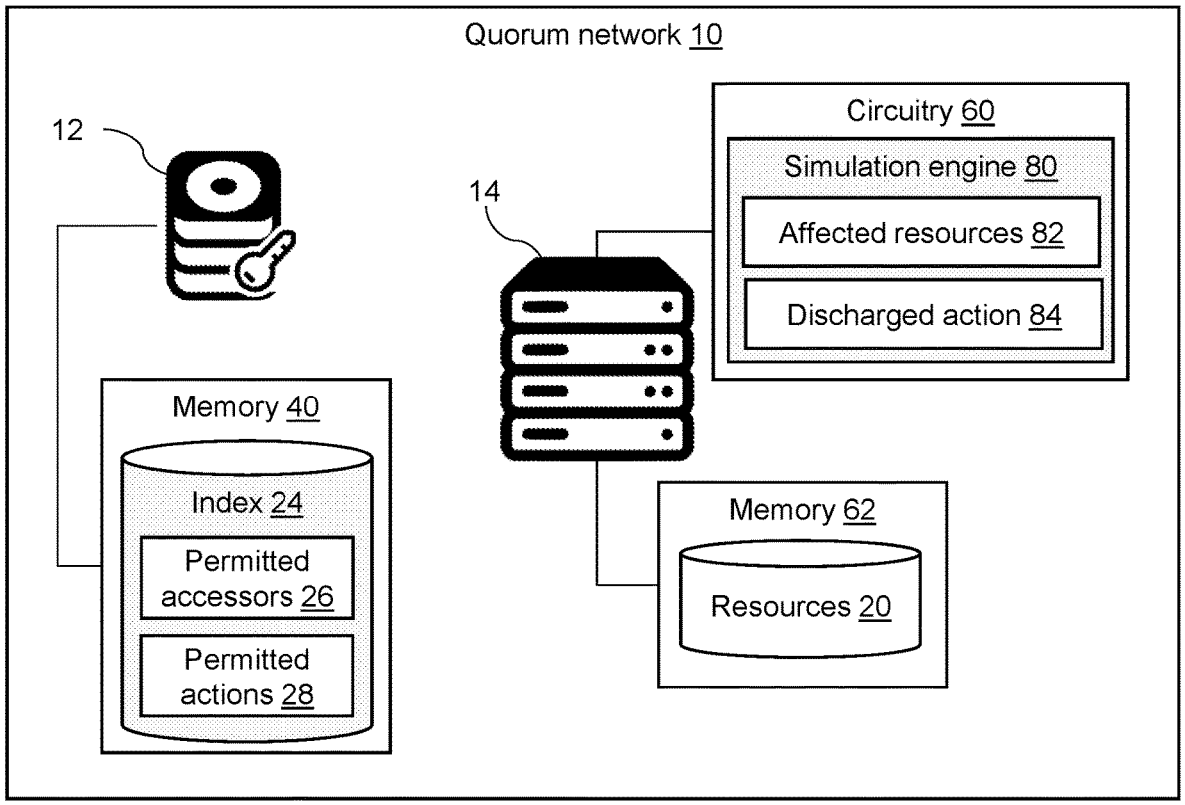
FIG. 1
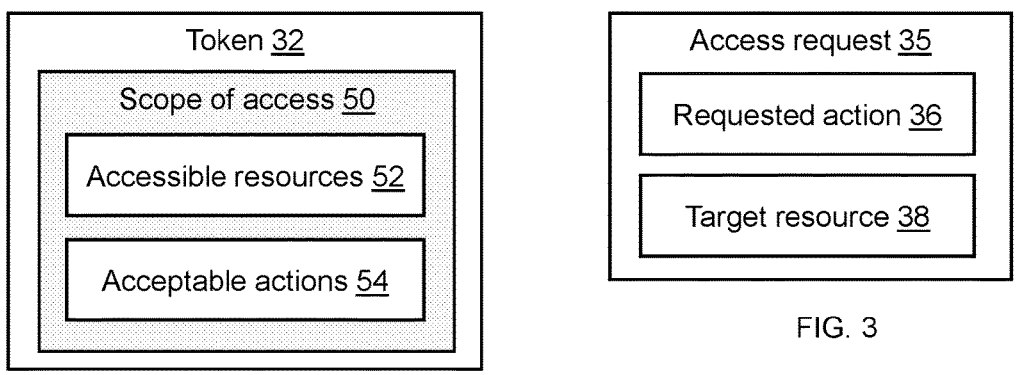
FIG. 2
FIG. 3

NETWORK MULTI-TENANT ARCHITECTURE FOR DISTRIBUTED LEDGER SYSTEMS

RELATED APPLICATIONS

This application claims the benefit of PCT/US2020/060879 filed on Nov. 17, 2020; and 62/937,714 filed on Nov. 19, 2019. Which are herein incorporated by reference in its entirety.

FIELD OF THE INVENTION

The present invention generally relates to distributed ledger systems and more particularly to a network multi-tenant architecture for distributed ledger systems.

BACKGROUND

Bitcoin, Ethereum, blockchain, and the concept of a "distributed ledger" have penetrated the financial industry's zeitgeist as large banks seek to leverage the notion of a cryptographically-verified ledger where trust is not provided by a central authority but is instead established by the dissemination of identical copies of the same ledger with cryptographic proof of its correctness.

Distributed systems, such as those based on Ethereum have been proven to be economically costly to run by Platform as a Service (PaaS) providers due to hardware requirements. Generally, distributed ledger systems are single tenant networks in that a different node is required for each entity. While each entity may have multiple users, resources from different entities cannot be stored on a single node, because each entity has access to the node has access to the resources stored on that node.

SUMMARY

In a general embodiment, the present disclosure provides a Quorum network comprising an access controlled multi-tenant network that is configured to enable access control and state isolation in a multi-tenancy Ethereum-based distributed ledger system. The access-controlled network includes one or more authenticating servers (also referred to as access controls) for providing permission control to the nodes in the network. In a standard multi-tenant network, each user of an entity (also referred to as an organization) is limited to only transacting with (also referred to as accessing) their own authorized resources. The access-controlled network utilizes an access controller to provide a singular truth for a set of managed nodes through a trusted entity (such as a Network Authorization Server).

A Quorum network provides effective state isolation between private and public state of the shelf and supports multi-tenant operations where both states are isolated such that an organization is allowed to interrogate only their own related state data.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages, and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

FIG. 1 is a schematic diagram of an embodiment of a computer system for providing a Quorum network.

FIG. 2 is a schematic diagram of an exemplary token.

FIG. 3 is a block diagram of an exemplary access request.

Figure 4:
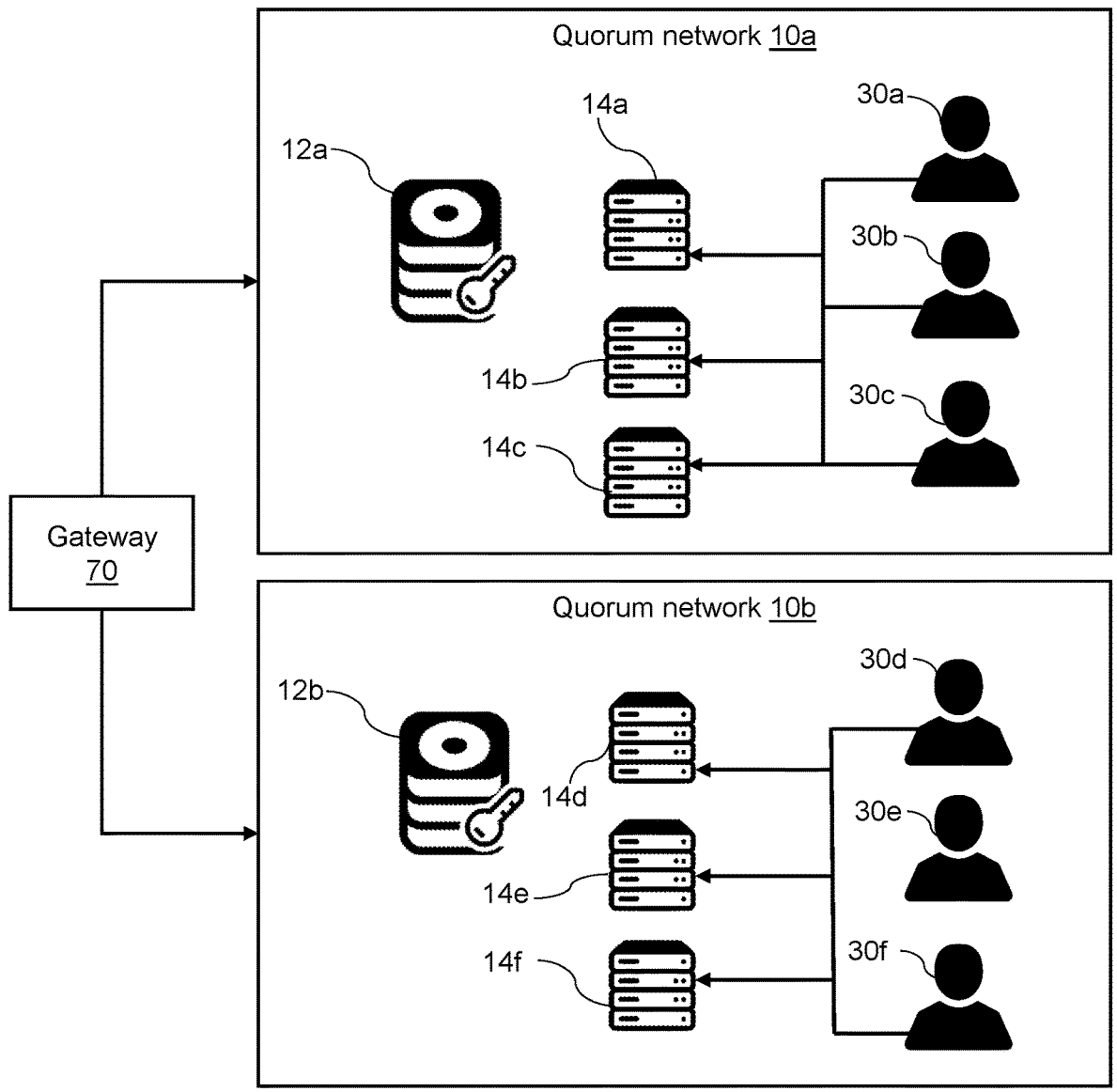
FIG. 4 is a schematic diagram of an embodiment of a computer system providing two Quorum networks.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

As described above, Software as a Service (SaaS) operators often manage nodes of a distributed ledger system for multiple organizations. Many of these organizations use the nodes infrequently. The Quorum network described herein allows SaaS operators to save costs by aggregating inactive (or less active) clients onto a single node. For multiple operators (i.e., multiple tenants) to use a shared node, the Quorum network provides access controls and data segregation.

Exemplary embodiments perform some or all of the following: support multiple organization through a single Quorum network while preserving data isolation; provide granular access control to protect states owned by each organization (each resource owner's users may be restricted to its own created resources); and/or provide the ability to interact with resources of other organizations when authorized by resource owners; etc.

In the embodiment depicted in FIGS. 1-3, a computer system 8 is show for providing a Quorum network 10. The Quorum network 10 is an access-controlled state-isolated multi-tenant Ethereum-based distributed ledger system. The computer system 8 includes a Quorum network 10 embodied as an authentication server 12 and a node 14. The node 14 stores resources 20 from multiple entities 22 and the authentication server 12 stores an index 24. The index 24 associates the stored resources 20 with permitted accessors 26 and permitted actions 28 that the permitted accessors 26 are authorized to perform on the stored resources 20. The authentication server 12 authenticates a user 30 attempting to access the resources 20 stored by the node 14. This authentication includes generating a token 32 based on received user credentials 34 and the permitted actions 28 of the user 30 specified in the index 24. The node 14 receives the token 32 and an access request 35 from the user 30 including a requested action 36 to perform on a target resource 38 of the stored resources 20. When the user 30 is identified by the token 32 as having authority to perform the requested action 36 on the target resource 38, then the node 14 performs the requested action 36.

As described above the authentication server 12 stores the index 24. The index 24 may be stored in non-transitory computer readable memory 40 of the authentication server 12. The index 24 associates each of the stored resources 20 with both: (1) permitted accessors 26 of the stored resource 20; and (2), for each of the permitted accessors 26, permitted actions 28 that the permitted accessor 26 is authorized to perform on the stored resource 20. The permitted actions 28 may include at least one of reading, creating, or writing.

The authentication server 12 authenticates a user 30 by receiving and validating user credentials 34 from the user 30. Based on the received user credentials 34, the authentication server 12 determines a scope of access 50 for the user 30 using the index 24. The scope of access 50 includes accessible resources 52 and acceptable actions 54. The accessible resources 52 identify the stored resources 20 for which the user 30 is one of the permitted accessors 26. The acceptable actions 54 identify, for each of the accessible resources 52, the permitted actions 28 that the user 30 is authorized to perform on the accessible resource 52. When the received user credentials 34 are valid, the authentication server 12 generates and outputs a token 32 authenticating the user 30 and including the scope of access 50 for the user 30.

The user credentials 34 may be any data or information used to authenticate a user, such as a username and password, security certificate, etc. Similarly, the token 32 may be any suitable information or data including the scope of access 50. The scope of access 50 may be a table or similar data structure associating accessible resources 52 with acceptable actions 54. The authentication server 12 may determine the scope of access 50 by accessing a table storing, for each user 30, accessible resources 52 and acceptable actions 54.

As described above, the node 14 receives the token 32 and an access request 35 from the user 30. The access request 35 includes a requested action 36 to perform on a target resource 38 of the stored resources 20. The node 14 compares the requested action 36 and the target resource 38 to determine if the user 30 is authorized to perform the requested action 36. That is, when the token 32 identifies both (1) the target resource 38 as one of the accessible resources 52 and (2) the requested action 36 as one of the acceptable actions 54 for the accessible resource 52, the node 14 performs the requested action 36 on the target resource 38. Conversely, when the token 32 either (1) does not identify the target resource 38 as one of the accessible resources 52 or (2) does not identify the requested action 36 as one of the acceptable actions 54 for the accessible resource 52, the node 14 may not perform the requested action 36 on the target resource 38. Similarly, if a user 30 attempts to access the node 14 without a token 32, then the node 14 may prevent access to the stored resources 20.

In one embodiment the node 14 includes circuitry 60 and a non-transitory computer readable memory 62. The memory 62 stores the resources 20. The circuitry 60 is configured to perform the actions executed by the node 14. For example, as is described in further detail below, the circuitry 60 may be a computer processor executing computer code.

The stored resources 20 may include any electronic data such as smart contracts. For example, the access request 35 may include as the target resource 38 an identifier specifying a contract index. The contract index may simply be a unique identifier that is associated with a user 30 and/or organization 22 in the index 24. In some embodiments, the access request 35 may include multiple target resources 38 (e.g., multiple contract addresses). The contract index may be built from the transaction information representing the global truth for the resource 20. The contract index may differ from node to node as it is built locally.

The node 14 may store data from different organizations 22 in the same state. That is, instead of segregating resources in different areas of the memory 62, the node 14 may rely on the authentication server 12 and the stored index 24 to effectively prevent unauthorized users 30 and entities 22 from accessing stored resources 20. In some embodiments, the stored resources 20 may also be stored in segregated memory based on the organization 22 that owns (e.g., is associated with) the resources 20. In such an embodiment, the index 24 may reference an in-memory store that holds the data for the entity 22.

The token 32 may be validated either by an introspection process (examining its own properties) or in-time signature validation.

The authorization server 12 may be any suitable device for providing access control to the node 14. In one embodiment, the authentication server 12 may be an enterprise authorization server that authenticates organization resources (e.g., users/decentralized applications) by mapping the resources and their permissions. Both the authentication server 12 and the node 14 may be executed by a same computer processor (i.e., on the same machine).

In the embodiment shown FIG. 4, the computer system 8 includes two Quorum networks 10a, 10b. Each of the Quorum networks 10 includes its own authorization server 12a, 12b and multiple nodes 14a-14f. Access to the Quorum networks 10a, 10b may be controlled by a gateway 70. The gateway 70 may be any suitable device for controlling electronic access to the Quorum networks 10a, 10b, such as a virtual private network (VPN) gateway, firewall, or router.

When the Quorum network 10 includes multiple nodes 14a, 14b, the stored resources 20 may be stored across the multiple nodes 14a-14f. In such an embodiment, the determined accessible resources 52 included in the scope of access 50 included in the token 32 may be stored in at least two of the multiple nodes 14a, 14b.

Figure 5:
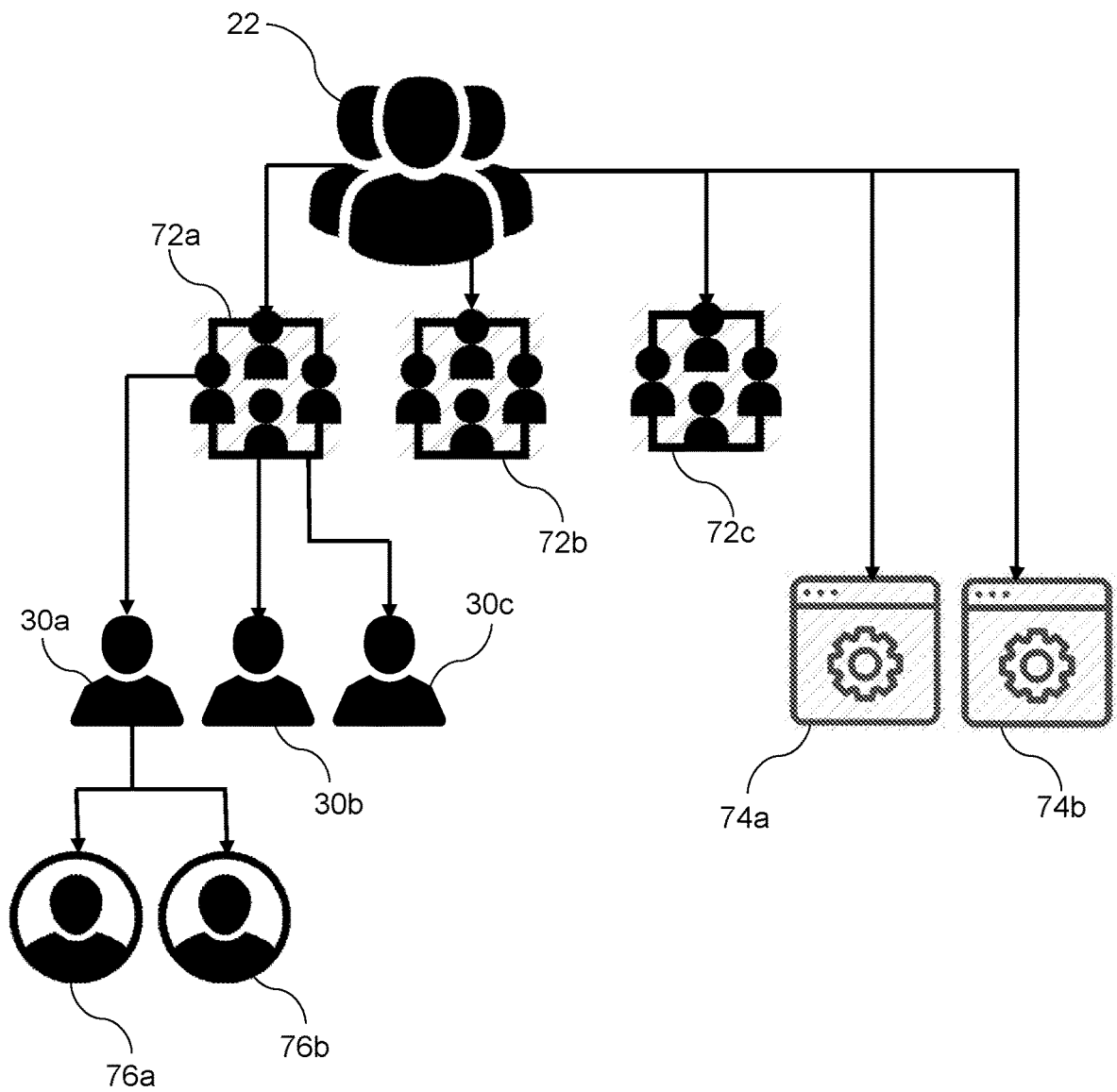
FIG. 5 is a schematic diagram of an exemplary structure of an organization.

In the embodiment shown in FIG. 5, an exemplary structure of an entity 22 and users 30a-c is shown. The depicted entity 22 is a multiple user entity (i.e., one of the entities 22 that is associated with multiple users 30a-c). The index 24 associates an entity resource (i.e., one of the stored resources 20) with the multiple user entity 22. In this embodiment, each of the multiple users 30a-30c is associated with the multiple user entity 22 are permitted accessors 26 of the entity resource 20. Similarly, each of the multiple users 30a-30c associated with the multiple user entity 22 are authorized to perform the same permitted actions 28 on the entity resource 20.

In one embodiment, users 30 may not be solely confined to resources 20 associated with their entity 22. That is, the index 24 may associate one of the stored resources 20 (referred to as an entity resource) with one of the entities 22 (referred to as an owning entity). An outside user 30 associated with a different entity (i.e., one of the multiple entities that is different from the owning entity) may be associated with this this entity resource 20 by the index 24. In this way, both users 30 inside and outside of an entity 22 may be granted access to a resource 20.

As shown in FIG. 5, an entity (also referred to as an organization) 22 may be conformed of departments 72 and each department 72 of users 30. In the entity 22, each user 30 may own one or more Ethereum accounts that the user is authorized to transact with. This mapping between entities 22, departments 72a-72c, and users 30a-30c may not be strict and other forms of a hierarchy may be used. The entity 22 may additionally include application(s) (also referred to as decentralized applications or Ethereum decentralized applications) 74a, 74b. A user 30a may be associated with one or more externally owned accounts (EOAs) 76a, 76b. The computer system 8 may include a network operator that manages authorization entitlements for each entity 22. Access to resources 20 may be defined at the entity 22 or department 74 level, such that all users 30 of an entity 22 or department 72 are given access to a resource 20.

Figure 6:
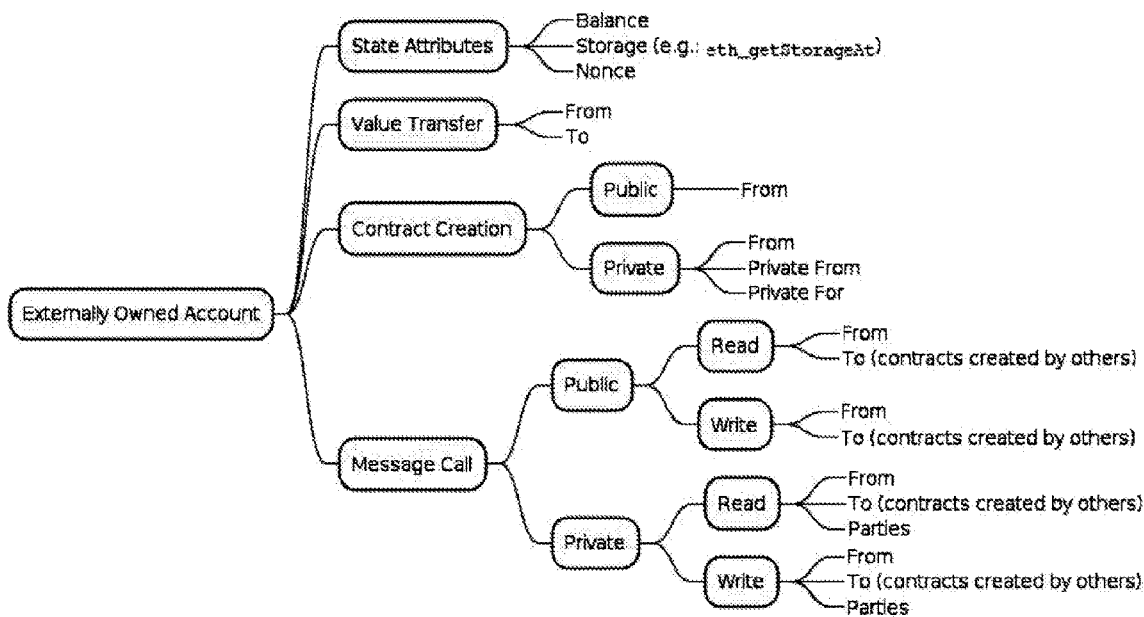
FIG. 6 depicts exemplary actions that may be performed on the stored resources.

Referring to FIG. 6, exemplary actions that each entity 22, user 30, application 74, and EOA 76 may perform are identified. Each action may be restricted granularly by the provisioning schema managed by the authorization server 12 and enforced by the node 14 (also referred to as a Quorum node). The authorization server 12 may maintain the scope in an organization 22 as representation of multi tenancy, each node 14 may build dynamically a representation of this truth as transactions flows through the node 14.

In the embodiment depicted in FIG. 6, different information that conform the overall elements of the multitenancy authorization schema representation and validation data are shown.

Figure 8:
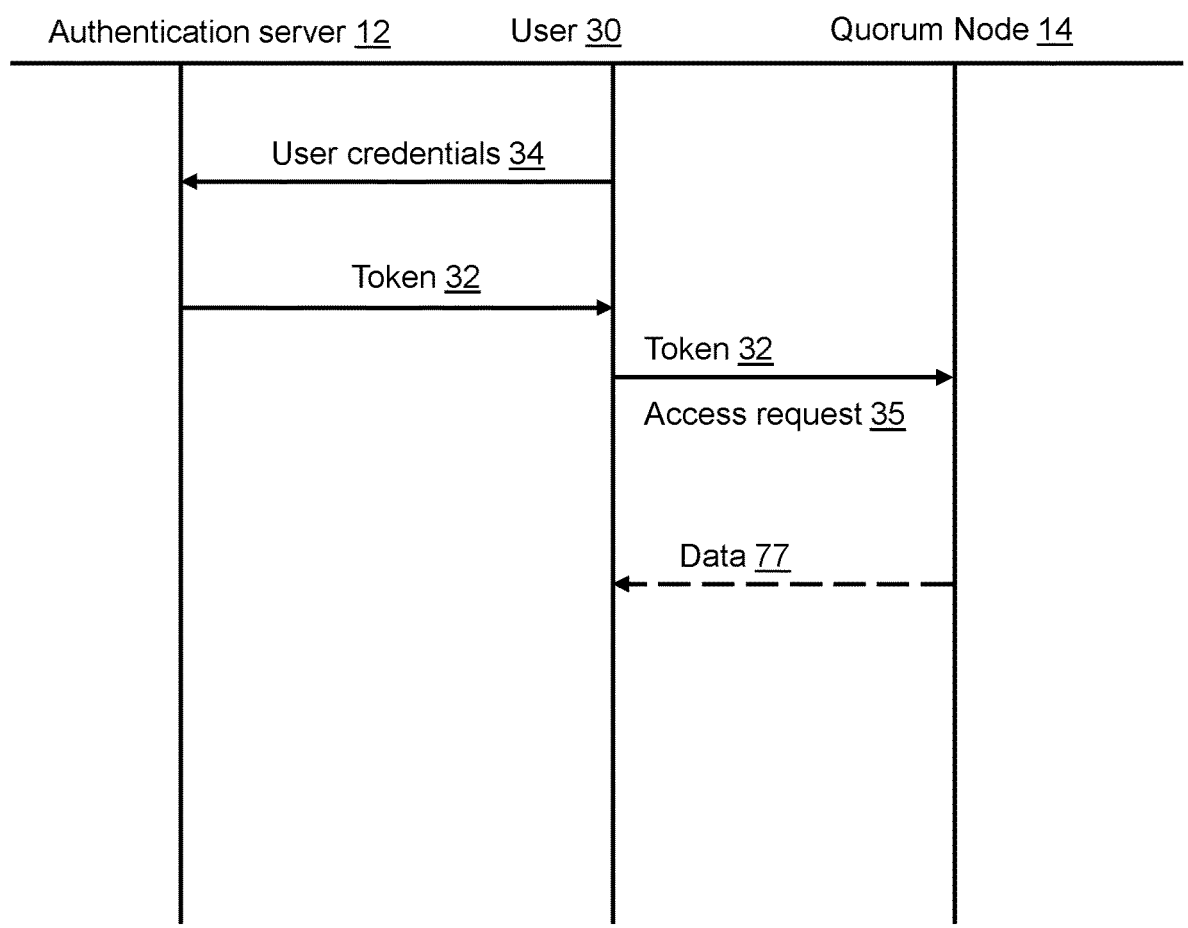
FIG. 8 is a ladder diagram depicting communication flow within the Quorum network.
Figure 9:
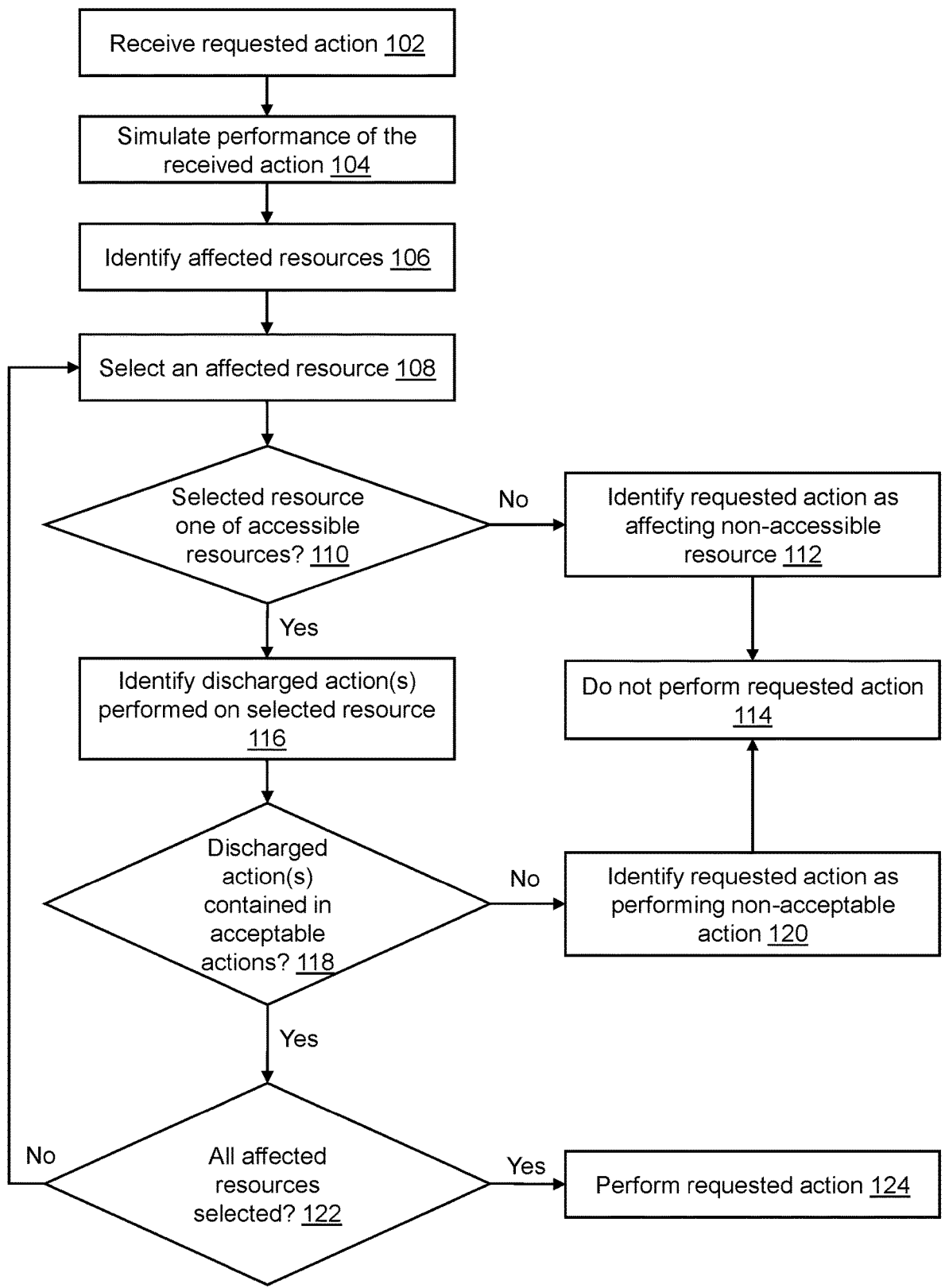
FIG. 9 is an exemplary method for using a simulation engine to determine the resources affected by a requested action.

In the exemplary embodiment shown in FIG. 8, exemplary communication within a Quorum network 10 is shown. A user 30 (the user 30 could also be an application 74, EOA 76, etc.) authenticates with the authentication server (also referred to as an authorization server) 12, and the authentication server 12 grants the user 30 an access token 32 including a list of scope 50. As described above, the scope 50 may contain information on what resources 20 the user 30 is authorized to transact with (e.g., accounts or contracts) and what actions are authorized to perform with those resources 20 (e.g., Create/Read/Write). As opposed to the authentication server 12 sending the token 32 to the user 30, the authentication server 12 may instead send the token 32 to the node 14. The node 14 may also send data 77 indicating the results of the access request 35 or indicating whether the requested action 36 was successfully performed.

The scope of access 50 (e.g., in the authorization server 12 or the token 32) may be represented as a string value. For example, the scope of access 50 may be represented in the following URL format:
<VISIBILITY>://<OWNER>/<ACTION>/<RESOURCE>?<ATTRIBUTE>

VISIBILITY: Represents the state this scope is applied to Values: [public|private]

OWNER: Represents the owner of this scope. For example, "0x0" may mean every account is included Values: [EOA-ADDRESS|0x0]

EOA-ADDRESS: Hex representation of an EOA 20-byte Address, prefixed with Ox

ACTION: The action authorized on the resources specified in this scope. Values: [read|write|create]

RESOURCE: Protected resource. Values: [state|contracts]

ATTRIBUTE: Information that include affected resources of this scope. Values: *(key=value) in which key=[owned.eoa|to.eoa|from.tm|for.tm|party.tm] and value is URL-encoded string owned.eoa|to.eoa: Hex representation of an EOA 20-byte Address, prefixed with Ox. If "0x0" is provided means every account is included. from.tm|for.tm|party.tm Transaction Manager Public Key Examples:

Value transfer public://0x0000000000000000000000000000000000a1a1a1/write/state?to.eoa=0x00000000000000000000000000000000000000b1b1b1

Read state of accounts public://0x0/read/state?owned.eoa=0x0000000000000000000000000000000000000000b1b1b1

Create public contracts public://0x00000000000000000000000000000000000000a1a1a1/create/contracts Read/write public contracts owned by others public://0x00000000000000000000000000000000000000a1a1a1/read/contracts?owned.eoa=0x00000000000000000000000000000000000000b1b1b1 public://0x00000000000000000000000000000000000000a1a1a1/write/contracts?owned.eoa=0x00000000000000000000000000000000000000b1b1b1&owner.eoa=0x00000000000000000000000000000000000000c1c1c1

Figure 7:
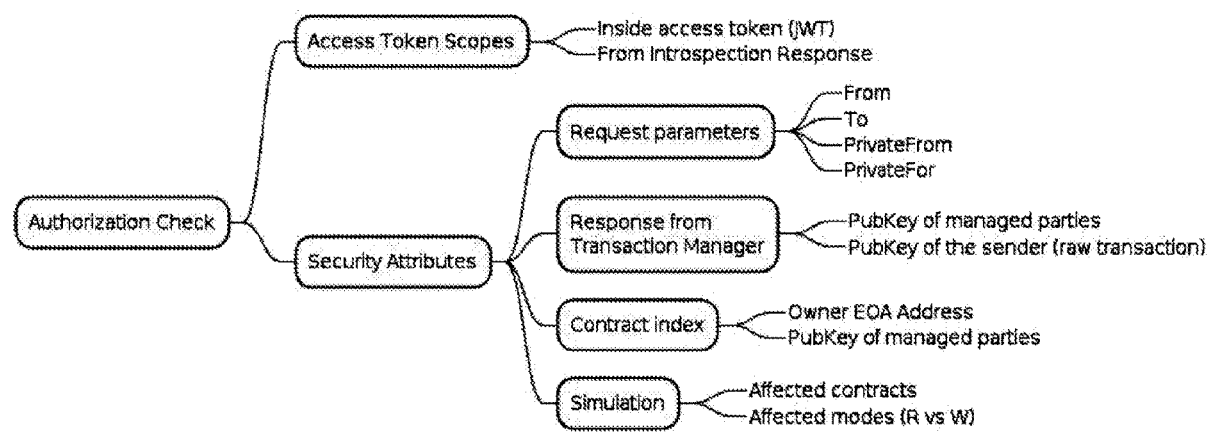
FIG. 7 illustrates elements of a multitenancy authorization schema representation and validation data.

Create private contracts private://0x00000000000000000000000000000000000000a1a1a1/create/contracts?from.tm=BULeR8JyUVVhiuuCM1.1%2FHLA0Q5pzkYT%2BcHII3ZKBey3Bo%3D &fortm=BULeR8JyUVVhiuuCM1.1%2FHLA0Q5pzkYT%2BcHII3ZKBey3Bo%3D Read/write private contracts owned by others and privy to party.tm private://0x00000000000000000000000000000000000000a1a1a1/read/contracts? owned.eoa=0x00000000000000000000000000000000000000b1b1b1&party.tm=BULeR8JyUVVhiuuCMU%2FHLA0Q5pzkYT%2BcHII3ZKBey3Bo%3DFHLA0Q5pzkYT%2BcHII3ZKBey3Bo%3Def In one embodiment, the node 14 executes a simulation engine 80. An exemplary flow diagram depicting operation 100 of the simulation engine 80 is shown in FIG. 7. In process block 102, the simulation engine 80 receives the requested action 36. In process block 104, the simulation engine 80 simulates performance of the received action 36 on the stored resources 20. In process block 106, possibly through a simulation engine 80, affected resources 82 are identified. The affected resources 82 are stored resources 20 that are affected by the requested action 36. The affected resources 82 may also be identified by using a lookup (e.g., a table) to identify the affected resources 82 and discharged actions 84 based on the requested action 36 and the target resource 38.

For each of the affected resources 82, the simulation engine 80 identifies a discharged action(s) 84 performed on the affected resource 82. For each of the affected resources 82, the simulation engine 80 uses the token 32 to determine: (1) whether the affected resource 82 is one of the accessible resources 52; and (2) whether the discharged action 84 performed on the affected resource 82 is one of the acceptable actions 54 for the affected resource 82. An exemplary embodiment of this process performed by the simulation engine 80 is shown beginning in process block 108.

In process block 108, an affected resource 82 is selected. In decision block 110, a check is performed to determine if the selected resource is one of the accessible resources 52 included in the token 32. If not, the requested action 36 is identified as affecting non-accessible resource 112 and the action is not performed by the node as shown in process block 114. If the selected resource is one of the accessible resources 52, then processing moves to process block 116.

In process block 116, the simulation engine 80 identifies the discharged action(s) 84. In decision block 118, a check is performed to determine if all of the discharged action(s) 84 are contained in the acceptable actions 54. If not, then processing moves to process block 120 and the requested action 36 is identified as performing a non-acceptable action 120 and the requested action 36 is not performed. If the discharged action(s) 84 are contained in the acceptable actions 84, the processing moves to decision block 122.

In decision block 122, a check is performed to determine if any affected resources 82 have not yet been selected. If yes, then processing moves back to process block 108. If not, then processing moves to process block 124 and the requested action 36 is performed.

That is, when the node 14 receives a token 32 and an access request 35, the node 14 checks whether the token 32 identifies both (1) the target resource 38 as one of the accessible resources 52 and (2) the requested action 36 as one of the acceptable actions 54 for the accessible resource 52. If not, then the node 14 does not perform the requested action 36. The node 14 also does not perform the requested action 36 on the target resource 38 (1) when each of the affected resources 82 is not one of the accessible resources 52 or (2) when each of the discharged actions 84 performed on the affected resource 82 is not one of the acceptable actions 54 for the affected resource 82. Conversely, the node 14 performs the requested action 36 on the target resource 38 (1) when each of the affected resources 82 is one of the accessible resources 52 and (2) when each of the discharged actions 84 performed on the affected resource 82 is one of the acceptable actions 54 for performing on the affected resource 82.

The simulation engine 80 may be a virtual machine (e.g., an Ethereum Virtual Machine (EVM)) executed by the node 14. The simulation engine 80 may attempt to execute the requested action 36 sent by the user in the access request 35 and determine the resources 20 affected by the requested action 36 by making a copy of the current state of the node 14. The simulation engine 80 may apply the requested action 36 to the copy of the current state of the node 14. The simulation engine 80 may then compare (1) the state resulting from applying the requested action 36 to the copy of the current state to (2) the copy of the current state.

During execution of the requested action 36 (also referred to as contract execution), the simulation engine 80 may be enhanced (compared to a standard EVM) to capture contract addresses (i.e., affected resources 82) and their affected modes (i.e., discharged actions 84). Affected mode may be a message call or a contract creation. The EVM may also be enhanced, such that when the EVM runs contract opcodes, if any opcode operation reveals a state modifying operation, the contract may be marked as write mode. Otherwise, it will be marked as read mode.

A requested action (also referred to as a transaction) executed in the simulation engine 80 may result in the following: (1) the affected contract addresses (i.e., affected resources 82); (2) the affected mode (create/message call) for each affected contract (included in the discharge action 84); and (3) the operation mode (read/write) for each affected contract (also included in the discharge action 84).

Each Quorum network 10 may be maintained by a Platform as Service (PaS) provider and/or a software as a service (SAAS) provider, which are and deemed as a trusted entity.

Figure 10:
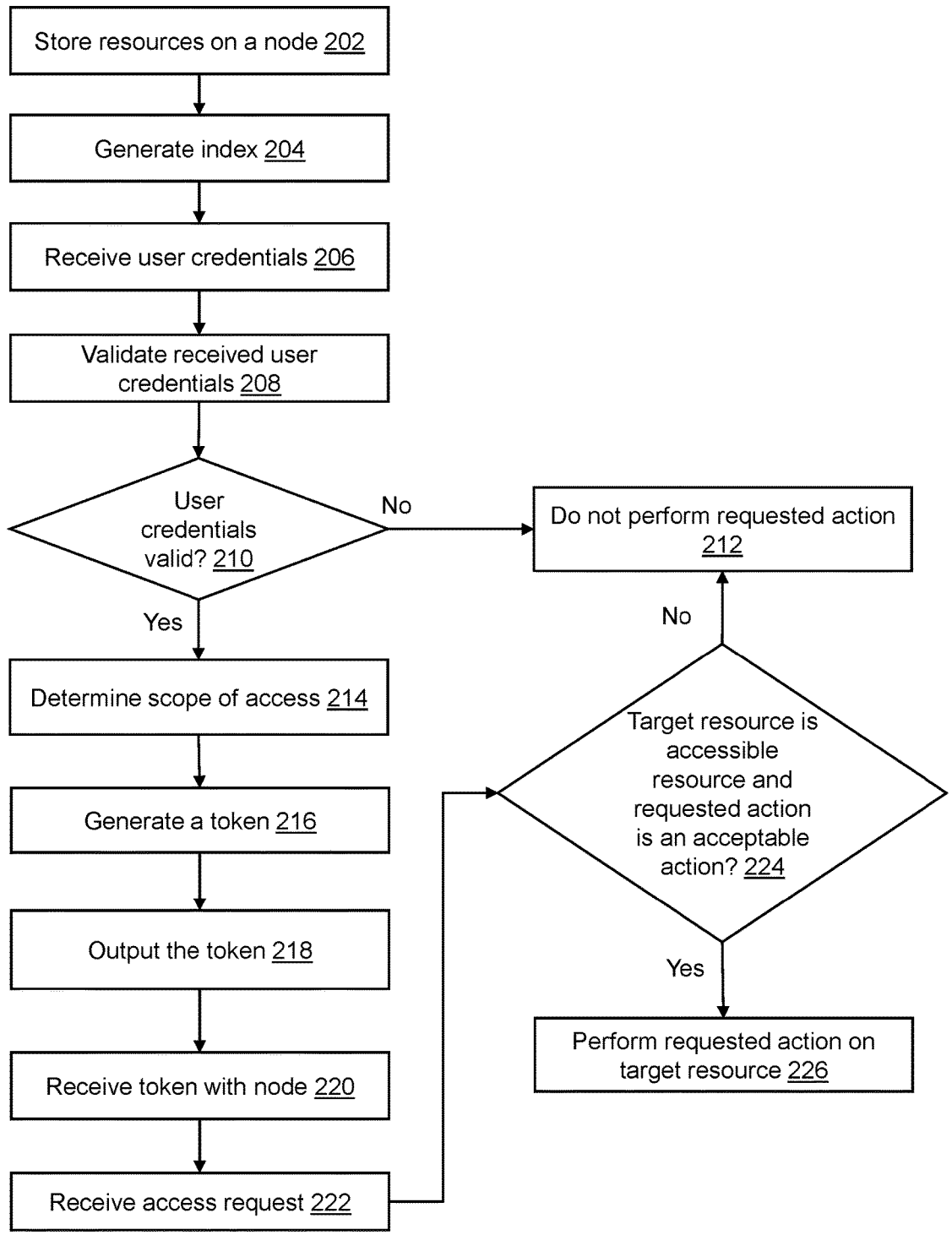
FIG. 10 is an exemplary method for providing an access-controlled state-isolated multi-tenant Ethereum-based distributed ledger system.

An embodiment of a method 200 for providing an access-controlled state-isolated multi-tenant Ethereum-based distributed ledger system is shown in FIG. 10. In process block 202, the node stores resources 20 from multiple entities 22. In process block 204, the authentication server 12 generates an index 24. As described above, the index 24 associates each of the stored resources 20 with both: permitted accessors 26 of the stored resource 20; and, for each of the permitted accessors 26, permitted actions 28 that the permitted accessor 26 is authorized to perform on the stored resource 20.

The authentication server 12 also authenticates a user 30. The authentication includes receiving user credentials 34 from the user 30 (process block 206), validating the received user credentials 34 (process block 208), and determining if the user credentials are valid (decision block 210).

When the received user credentials 34 are not valid, processing moves to process block 212 and the requested action 36 is not performed. When the received user credentials 34 are valid, processing moves to process block 214 and a scope of access 50 for the user is determined based on the received user credentials 34 and using the index 24. The scope of access 50 includes: (1) accessible resources 52 comprising the stored resources 20 for which the user 30 is one of the permitted accessors 26; and (2) acceptable actions 54 comprising, for each of the accessible resources 52, the permitted actions 28 that the user 30 is authorized to perform on the accessible resource 52. As described above, the scope of access 50 may be determined by using the simulation engine 80 or a lookup. In process block 216, a token 32 is generated that authenticates the user 30 and includes the scope of access 50. In process block 218, the token is output.

In process block 220, the token 32 is received with the node 14. In process block 222, the node 14 receives an access request 35 from the user 30 including a requested action 36 to perform on a target resource 38 of the stored resources 20. In decision block 224, the node 14 determines whether the token 32 identifies both the target resource 38 as one of the accessible resources 52 and the requested action 36 as one of the acceptable actions 54 for the accessible resource 20. If yes, then processing moves process block 226 and the requested action 36 is performed with the node 14 on the target resource 38. If not, then processing moves to process block 212 and the requested action 36 is not performed on the target resource 38.

The disclosures of U.S. Provisional Patent Application Ser. No. 62/316,841 and U.S. patent application Ser. No. 15/475,846 are hereby incorporated, by reference, in their entireties.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user.

Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A computer system for providing a Quorum network comprising an access-controlled state-isolated multi-tenant Ethereum-based distributed ledger system comprising multiple nodes, the computer system including:
   a single node of the multiple nodes including circuitry configured to store resources from multiple entities, such that the resources are segregated and access to the resources is controlled based on a received token;
   an authentication server including an index, wherein:
      the index associates each of the stored resources with both:
         permitted accessors of the stored resource; and
         for each of the permitted accessors, permitted actions that the permitted accessor is authorized to perform on the stored resource;

the authentication server is configured to authenticate a user by:
  receiving user credential from the user;
  validating the received user credentials; and
  when the received user credentials are valid:
    based on the received user credentials, determining using the index a scope of access for the user including:
      accessible resources comprising the stored resources for which the user is one of the permitted accessors; and
      acceptable actions comprising, for each of the accessible resources, the permitted actions that the user is authorized to perform on the accessible resource;
    generating the token authenticating the user and including the scope of access; and
    outputting the token;
wherein the node is further configured to:
  receive the token, and an access request from the user including a requested action to perform on a target resource of the stored resources;
  when the token identifies both the target resource as one of the accessible resources, and the requested action as one of the acceptable actions for the accessible resource, perform the requested action on the target resource; and
  when the token either does not identify the target resource as one of the accessible resources, or does not identify the requested action as one of the acceptable actions for the accessible resource, does not perform the requested action on the target resource.

2. The computer system of claim 1, wherein the node is further configured to:
  execute a simulation engine comprising:
    receiving the requested action;
    simulating performance of the received action on the stored resources;
    identifying affected resources comprising the stored resources affected by the requested action; and
    for each of the affected resources, identifying a discharged action comprising an action performed on the affected resource; and
    for each of the affected resources, determining using the token:
      whether the affected resource is one of the accessible resources; and
      whether the discharged action performed on the affected resource is one of the acceptable actions for the affected resource.

3. The computer system of claim 2, wherein, when the token identifies both the target resource as one of the accessible resources, and the requested action as one of the acceptable actions for the accessible resource, the node:
  does not perform the requested action on the target resource when each of the affected resources is not one of the accessible resources or when each of the discharged actions performed on the affected resource is not one of the acceptable actions for the affected resource; and
  performs the requested action on the target resource when each of the affected resources is one of the accessible resources, and when each of the discharged actions performed on the affected resource is one of the acceptable actions for performing on the affected resource.

4. The computer system of claim 1, wherein the node is further configured to:
  receive the requested action;
  using a lookup and the requested action:
    identify affected resources comprising the stored resources affected by the requested action; and
    for each of the affected resources, identify a discharged action comprising an action performed on the affected resource; and
  for each of the affected resources, determine using the token:
    whether the affected resource is one of the accessible resources; and
    whether the discharged action performed on the affected resource is one of the acceptable actions for the affected resource.

5. The computer system of claim 1, wherein:
  a multiple user entity comprising one of the multiple entities is associated with multiple users; and
  the index associates an entity resource comprising one of the stored resources with the multiple user entity, such that:
    each of the multiple users associated with the multiple user entity are permitted accessors of the entity resource; and
    each of the multiple users associated with the multiple user entity are authorized to perform the same permitted actions on the entity resource.

6. The computer system of claim 1, wherein:
  the index associates an entity resource of the stored resources with an owning entity of the multiple entities;
  an outside user is associated with one of the multiple entities different from the owning entity; and
  the index also associates the entity resource with the outside user.

7. The computer system of claim 1, wherein the scope of access is a string value in a URL-based format.

8. The computer system of claim 1, wherein the authentication server and the node are executed by a same computer processor.

9. The computer system of claim 1, further comprising multiple nodes, such that:
  the stored resources are stored across the multiple nodes; and
  the determined accessible resources included in the scope of access included in the token are stored in at least two of the multiple nodes.

10. The computer system of claim 1, wherein the stored resources include smart contracts.

11. The computer system of claim 1, wherein the permitted actions include reading, creating, and writing.

12. A method for providing an access-controlled state-isolated multi-tenant Ethereum-based distributed ledger system comprising multiple nodes, the method comprising:
  storing resources from multiple entities on a single node of the multiple nodes, such that the resources are segregated and access to the resources is controlled based on a received token, wherein the node includes circuitry;
  generating an index using an authentication server, wherein:
    the index associates each of the stored resources with both:
      permitted accessors of the stored resource; and
      for each of the permitted accessors, permitted actions that the permitted accessor is authorized to perform on the stored resource;

authenticate a user using the authentication server by:
  receiving user credentials from the user;
  validating the received user credentials; and
  when the received user credentials are valid:
    based on the received user credentials, determining using the index a scope of access for the user including:
      accessible resources comprising the stored resources for which the user is one of the permitted accessors; and
      acceptable actions comprising, for each of the accessible resources, the permitted actions that the user is authorized to perform on the accessible resource;
    generating the token authenticating the user and including the scope of access; and
    outputting the token;
receiving the token with the node;
receiving with the node an access request from the user including a requested action to perform on a target resource of the stored resources;
when the token identifies both the target resource as one of the accessible resources and the requested action as one of the acceptable actions for the accessible resource, performing with the node the requested action on the target resource; and
when the token either does not identify the target resource as one of the accessible resources or does not identify the requested action as one of the acceptable actions for the accessible resource, not performing with the node the requested action on the target resource.

13. The method of claim 12, further comprising:
the node executing a simulation engine comprising:
  receiving the requested action;
  simulating performance of the received action on the stored resources;
  identifying affected resources comprising the stored resources affected by the requested action; and
  for each of the affected resources, identifying a discharged action comprising an action performed on the affected resource; and
  for each of the affected resources, determining using the token:
    whether the affected resource is one of the accessible resources; and
    whether the discharged action performed on the affected resource is one of the acceptable actions for the affected resource.

14. The method of claim 13, wherein, when the token identifies both the target resource as one of the accessible resources, and the requested action as one of the acceptable actions for the accessible resource, the node:
  does not perform the requested action on the target resource when each of the affected resources is not one of the accessible resources or when each of the identified actions performed on the affected resource is not one of the acceptable actions for the affected resource; and
  performs the requested action on the target resource when each of the affected resources is one of the accessible resources, and when each of the identified actions performed on the affected resource is one of the acceptable actions for performing on the affected resource.

15. The method of claim 12, further comprising:
receiving with the node the requested action;
the node using a lookup and the requested action to:
  identify affected resources comprising the stored resources affected by the requested action; and
  for each of the affected resources, identify a discharged action comprising an action performed on the affected resource; and
for each of the affected resources, determine using the token:
  whether the affected resource is one of the accessible resources; and
  whether the discharged action performed on the affected resource is one of the acceptable actions for the affected resource.

16. The method of claim 12, wherein:
a multiple user entity comprising one of the multiple entities is associated with multiple users; and
the index associates an entity resource comprising one of the stored resources with the multiple user entity, such that:
  each of the multiple users associated with the multiple user entity are permitted accessors of the entity resource; and
  each of the multiple users associated with the multiple user entity are authorized to perform the same permitted actions on the entity resource.

17. The method of claim 12, wherein:
the index associates an entity resource of the stored resources with an owning entity of the multiple entities;
an outside user is associated with one of the multiple entities different from the owning entity; and
the index also associates the entity resource with the outside user.

18. The method of claim 12, wherein the scope of access is a string value in a URL-based format.

19. The method of claim 12, further comprising multiple nodes, such that:
the stored resources are stored across the multiple nodes; and
the determined accessible resources included in the scope of access included in the token are stored in at least two of the multiple nodes.

20. The method of claim 12, wherein the stored resources include smart contracts.

* * * * *